United States Patent Office 3,290,288
Patented Dec. 6, 1966

3,290,288
PROCESS FOR THE DIMERIZATION OF AROMATIC ISOCYANATES
Gunter Oertel, Cologne-Flittard, and Hans Holtschmidt, Cologne-Stammheim an der Ruthen, Germany, assignors to Farbenfabriken Bayer Aktiengesellschaft, Leverkusen, Germany, a German corporation
No Drawing. Filed Dec. 5, 1963, Ser. No. 328,161
Claims priority, application Germany, Dec. 19, 1962, F 38,596
8 Claims. (Cl. 260—239)

This invention relates to dimerized aromatic isocyanates and to a method of preparation. More particularly, it relates to a method of preparing isocyanate dimers from aromatic isocyanates containing at least one aromatically bound NCO group having only hydrogen in both ortho positions.

It is known that aromatic isocyanates can be dimerized under the influence of catalytic quantities of trialkyl phosphines (J. Org. Chem., 1943, 8, 230). The process provides yields of only 65 to 85% and offers also numerous difficulties in practice. Since trialkyl phosphines are air-sensitive and have a tendency to ignite spontaneously, all operations must be carried out in an atmosphere of inert gas. In addition, trialkyl phosphines are malodorous and, since they remain after the dimerization, they must be removed by tedious washing processes. Apart from the nuisance of the odor of the final product, careful removal of the catalyst is particularly necessary if the dimerization products are to be used in the synthesis of polyurethanes, as is the case with, for example, dimeric toluylene-2,4-diisocyanate. Trialkyl phosphines are known to accelerate all isocyanate reactions and thus disturb the normal progress of the formation of polyurethane, even if they constitute only minute impurities in the dimerization products. An additional disadvantage of the process is that the trialkyl phosphines are technically only obtainable by a very complicated process involving organometallic compounds.

It is therefore an object of this invention to provide an improved process for the dimerization of aromatic isocyanates. It is another object of this invention to provide a process which obviates all disadvantages of the aforementioned process. It is still another object of this invention to provide a process for the dimerization of aromatic isocyanates in high yields.

The foregoing objects and others which will become apparent from the following description are accomplished in accordance with the invention, generally speaking, by providing a method of dimerizing aromatic isocyanates having only hydrogen atoms in the position on the benzene nucleus ortho to at least one NCO group by contacting the aromatic isocyanate with a catalytic amount of a compound having the formula

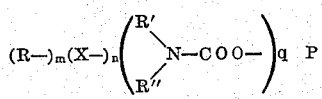

wherein R is an organic radical;

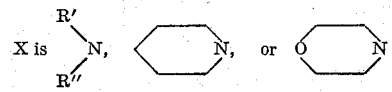

R' and R" are alkyl, alkenyl or cycloalkyl; $m$ is 0, 1 or 2; $n$ is 0, 1, 2 or 3; and $q$ is 0, 1 or 2; the sum of $m$, $n$ and $q$ being 3.

In the above formula, R may be any monovalent organic radical such as, for example, alkyl, alkenyl, cycloalkyl, aralkyl, aryl, O-alkyl, O-alkenyl, O-cycloalkyl, O-aralkyl, O-aryl, S-alkyl, S-alkenyl, S-cycloalkyl, S-aralkyl, S-aryl, where O and S are oxygen and sulfur through which the organic portion of the molecule is connected to the phosphorous atom of the molecule. Any suitable radical in accordance therewith may be used such as, for example, methyl, ethyl, n-propyl, isopropyl, n-butyl, isobutyl, sec-butyl, t-butyl, n-amyl and various positional isomers thereof such as, for example, 1-methyl-butyl, 2-methyl-butyl, 3-methyl-butyl, 1,1-dimethylpropyl, 1,2-dimethylpropyl, 2,2-dimethylpropyl, 1-ethylpropyl and the like, corresponding straight and branched chain isomers of hexyl, heptyl, octyl, nonyl, decyl, undecyl, dodecyl, tridecyl, tetradecyl, pentadecyl, hexadecyl, heptadecyl, octadecyl, nondecyl, eicosyl and the like, ethenyl, 1-propenyl, 2-propenyl, isopropenyl, 1-butenyl, 2-butenyl, 3-butenyl, 1-isobutenyl, 2-isobutenyl, 1-sec-butenyl, 2-sec-butenyl, including 1-methylene-2-propenyl, 1-pentyl, 2-pentenyl, 3-pentenyl, 4-pentenyl, 1-hexenyl, 2-hexenyl, 3-hexenyl, 4-hexenyl, 5-hexenyl, 3,3-dimethyl-1-butenyl, 2,3-dimethyl-1-butenyl, 2,3-dimethyl-2-butenyl, 2,3-dimethyl-3-butenyl, 1-methyl-1-ethyl-2-propenyl; and the various isomers of heptenyl, octenyl, nonenyl, decenyl, undecenyl, dodecenyl, tridecenyl, tetradecenyl, pentadecenyl, hexadecenyl, heptadecenyl, octadecenyl, nondecenyl, eicosenyl and the like, cyclopropyl, cyclobutyl, cycloamyl, cyclohexyl, cycloheptyl, cyclooctyl, cyclononyl, cyclodecyl, cycloundecyl, cyclododecyl, cyclotridecyl, cyclotetradecyl, cyclopentadecyl, cyclohexadecyl, cycloheptadecyl, cyclooctodecyl, cyclonondecyl, cycloeicosyl, α-cyclopropyl-ethyl, β-cyclopropyl-ethyl, α-cyclobutyl-propyl, β-cyclobutyl-propyl, gamma-cyclobutyl-propyl, α-cycloamyl-isopropyl, β-cycloamyl-isopropyl and the like, α-phenyl-ethyl, β-phenyl-ethyl, α-phenyl-propyl, β-phenyl-propyl, gamma-phenyl-propyl, α-phenyl-isopropyl, β-phenyl-isopropyl, α-phenyl-butyl, β-phenyl-butyl, gamma-phenyl-butyl, delta-phenyl-butyl, α-phenyl-isobutyl, β-phenyl-isobutyl, gamma-phenyl-isobutyl, α-phenyl-sec-butyl, β-phenyl-sec-butyl, gamma-phenyl-sec-butyl, β-phenyl-t-butyl, α'-naphthyl-methyl, β'-naphthyl-methyl, α-(β'-naphthyl)-ethyl, β-(α'-naphthyl)-ethyl, β-(β'-naphthyl)-ethyl, α-(α'naphthyl)-propyl, α-(β'-naphthyl)-propyl, β-(α'-naphthyl)-propyl, β-(β'-naphthyl)-propyl, gamma-(α'-naphthyl)-propyl, gamma-(β'-naphthyl)-propyl, α-(α'-naphthyl)-isopropyl, α-(β'-naphthyl)-isopropyl, α-(α'-naphthyl)-butyl, α-(β'-naphthyl)-butyl, β-(α'-naphthyl)-butyl, β-(β'-naphthyl)-butyl, gamma-(α'-naphthyl)-butyl, gamma-(β'-naphthyl)-butyl, delta-(α'-naphthyl)-butyl, α-

(α'-naphthyl)-isobutyl, α-(β'-naphthyl)-isobutyl, β-(α'-naphthyl)-isobutyl, β-(β'-naphthyl)-isobutyl, gamma-(α'-naphthyl)-isobutyl, gamma-(β'-naphthyl)-isobutyl, α-(α'-naphthyl)-sec-butyl, α-(β'-naphthyl)-sec-butyl, β-(α-naphthyl)-sec-butyl, β-(β'-naphthyl)-sec-butyl, gamma-(α'-naphthyl)-sec-butyl, gamma-(β'-naphthyl)-sec-butyl, β-(α-naphthyl)-t-butyl, β-(β'-naphthyl)-t-butyl, 1-methyl-butyl, 2-methyl-butyl, 3-methyl-butyl, 1,1-dimethyl-propyl, 1,2-dimethyl-propyl, 2,2-dimethyl-propyl, 1-ethyl-propyl and hexyl, heptyl, and octyl and the like; eicosyl, α'-anthryl-methyl, α-(β-anthryl)-ethyl, β-(γ'-anthryl)-ethyl, α - (α'-anthryl)-butyl, delta-(β'-anthryl)-2-methyl-amyl, phenanthrene, fluorene, acenaphthene, chrysens, pyrene, triphenylene, naphthacene, phenyl, α-naphthyl, β-naphthyl, α-anthryl, β-anthryl, gamma-anthryl, indene, isoindene, acenaphthene, fluorene, phenanthrene, naphthacene, chrysene, pyrene, triphenylene and the like. Of course, any of the above mentioned radicals may be connected to the phosphorous atom through either oxygen or sulfur.

In the formula represented above, R' and R" are either alkyl, alkenyl or cycloalkyl radicals. Any of the alkyl, alkenyl or cycloalkyl radicals mentioned above in the definition of R can be used in the formula for R' and R".

In contrast to the phosphines, the catalysts necessary for the process are known compounds and are readily available. The catalysts according to the formula are, for example, obtainable by reacting phosphorous acid chlorides, such as phosphorus trichloride, phosphorous acid ester chlorides, e.g. phosphinous or phosphonous acid chlorides, for example, phosphorous acid mono ethyl ester dichloride, phosphorous acid dicyclohexyl ester mono chloride, phosphorous acid phenyl thioester dichloride, dimethyl phosphinous acid chloride, phenyl ethyl phosphinous acid chloride, styryl phosphonous acid dichloride, methane phosphonous acid monoethyl ester chloride, with secondary amines, e.g. dimethylamine, methyl propyl amine, dicyclohexyl amine, methyl benzyl amine, dialkyl amine. The catalysts containing carbamido groups, can for example, be obtained from the amino compounds by the action of carbon dioxide, in accordance with French Patent 1,337,082.

In contrast to the trialkyl phosphines, the compounds according to the formula, are not air-sensitive and in particular, do not ignite spontaneously, so that all operations in the process according to the invention can be carried out without using a protective gas. The essential advantage of the new catalysts over the phosphines consists, however, in that they are consumed at the end of the dimerization; they react irreversibly with isocyanate groups and are so transformed that they lose the ability to catalyze isocyanate reactions, including dimerization. Although the composition of these catalyst decomposition products is not clear, the consumption of the catalyst can, nevertheless, very easily be proved. For example, an isocyanate is dimerized in an inert solvent that dissolves both the catalyst and the isocyanate, e.g. benzine; the insoluble dimer is separated by filtration and fresh isocyanate is added to the filtrate, which should contain unchanged catalyst if such exists. However, neither renewed dimerization nor any change in the isocyanate occurs, so therefore the catalyst originally introduced can no longer be present.

This particular property of the catalyst makes it possible to dispense with purification of the end product by washing or extraction processes. Completely odorless and very pure products are directly obtained in high yield.

Suitable for the process according to the invention are isocyanates which contain at least one aromatically bonded isocyanate group which comprises only hydrogen atoms in both ortho positions of the aromatic ring. Only isocyanates of this type are dimerized by the catalysts according to the invention. Isocyanates comprising substituents in the ortho-position of the aromatic ring or compounds containing isocyanate groups which are not aromatically bonded are, on the contrary, not modified under the conditions of the process.

The following are examples drawn from the large number of isocyanates suitable for the process.

(a) Isocyanates with an aromatically bonded NCO group, which comprise only hydrogen atoms in both ortho-positions of the aromatic ring.

Special examples of these are:

phenyl isocyanate,
m-tolyl isocyanate,
p-tolyl isocyanate,
4-cycolhexyl-phenyl isocyanate,
diphenylmethane-4-isocyanate,
3,4-dichlorophenyl isocyanate,
3-chlorophenyl isocyanate,
3-nitrophenyl isocyanate,
4-nitrophenyl isocyanate,
3-cyanophenyl isocyanate,
4-chloro-3-(trifluoromethyl)-phenyl isocyanate,
3-chloromethyl-phenyl isocyanate,
4-methyl-3-nitrophenyl isocyanate,
4-methoxy phenyl isocyanate,
3-(N-carbomethoxy)-phenyl isocyanate,
3-(α-chloroethyl)-phenyl isocyanate,
4-ethoxyphenyl isocyanate,
4-carbethoxyphenyl isocyanate,
4,4-dichlorodiphenyl ether-2-isocyanate,
3-isocyanatobenzene methyl sulphonamide,
4-isocyanatoazo benzene,
2-naphthyl isocyanate,
phenanthryl-3-isocyanate,
N-ethyl carbazolyl-3-isocyanate,
4-(0,0-diethyl dithiophosphoryl)-phenyl isocyanate.

(b) Isocyanates with an aromatically bonded NCO group, which comprise only hydrogen atoms in both ortho positions of the aromatic ring, containing one or more additional NCO groups, which either are not aromatically bonded or are substituted by other radicals in one or both ortho-positions of the aromatic ring.

Special examples of these are:

tolylene-2,4-diisocyanate,
tolylene-2,5-diisocyanate,
1-ethylbenzene-2,4-diisocyanate,
1-chlorobenzene-2,4-diisocyanate,
1-nitrobenzene-2,5-diisocyanate,
1-methoxy-benzene-2,5-diisocyanate,
1-propoxybenzene-2,4-diisocyanate,
1-carbethoxybenzene-2,4-diisocyanate,
diphenyl ether-2,4'-diisocyanate,
α,β-diphenylethane-2,4-diisocyanate,
4-methyldiphenyl sulphide-2',4'-diisocyanate,
4-methyl-3-isocyanatobenzene-sulphonyl-4'-isocyanatophenyl ester,
4-methoxy-3-isocyanato-benzene-sulphonyl-4'-isocyanatophenyl ester,
1-methylbenzene-2,4,6-triisocyanate,
4-phenyl isocyanato-methyl isocyanate,
4-phenyl isocyanto-β-ethyl isocyanate,
3-phenyl isocyanto-γ-propyl isocyanate,
hexahydrobenzidine-4,4'-diisocyanate,
hexahydrodiphenylmethane-4,4'-diisocyanate.

(c) Isocyanates with two or more aromatically bonded NCO groups, which comprise only hydrogen atoms in both ortho-positions on the aromatic ring.

The following are to be mentioned as special examples:

1,3-phenylene diisocyanate,
1,4-phenylene diisocyanate,
1-methylbenzene-3,5-diisocyanate, azobenzene-4,4'-diisocyanate,
naphthalene-2,6-diisocyanate,
diphenyl-4,4'-diisocyanate,
benzophenone-3,3'-diisocyanate,
3-nitro-triphenylmethane-4',4'''-diisocyanate,
diphenyl disulphide-4,4'-diisocyanate,
diphenyl sulphone-4,4'-diisocyanate,
naphthalene-1,3,7-triisocyanate,
diphenyl-2,4,4'-triisocyanate,
triphenylmethane-4,4',4''-triisocyanate.

The isocyanates mentioned as examples under (a) and (b) form compounds with twice the molecular weight of the starting compound, when they are treated with catalysts by the process according to the invention, by dimerization of the aromatically-bonded NCO group, which comprises only hydrogen atoms in both ortho positions of the aromatic ring. Thus, for example, the dimer

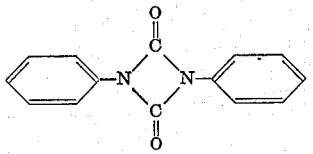

is formed from phenyl isocyanate and the dimer

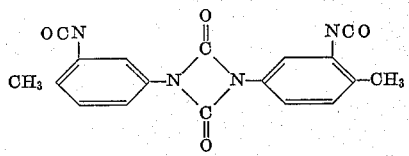

is formed from toluylene-3,4-diisocyanate.

On the contrary, by the action of catalysts of the isocyanates which are mentioned as examples under (c) and which contain two or more aromatically bonded NCO groups, which comprise only hydrogen atoms in both ortho-positions of the aromatic ring, trimers or tetramers can, for example, be formed as well as dimers. They still contain free NCO groups. For example, diphenylmethane-4,4'-diisocyanate, in addition to dimers of the formula

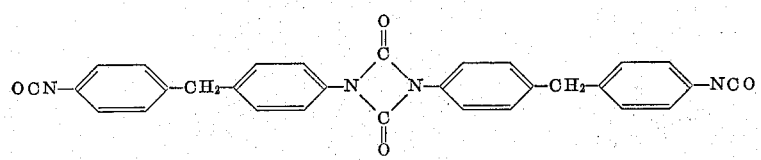

forms oligomers of the formula (n=2 to 5)

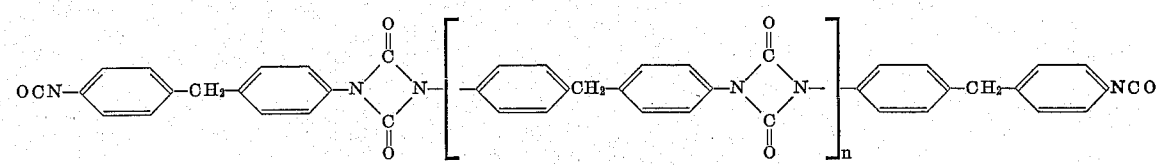

It is also possible for several isocyanates to be subjected simultaneously and jointly to the catalytic process according to the invention.

The following compounds are special examples of catalysts of the invention.

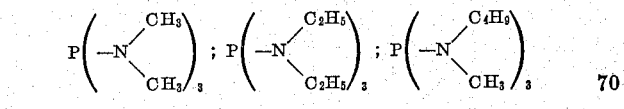

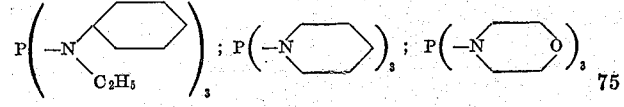

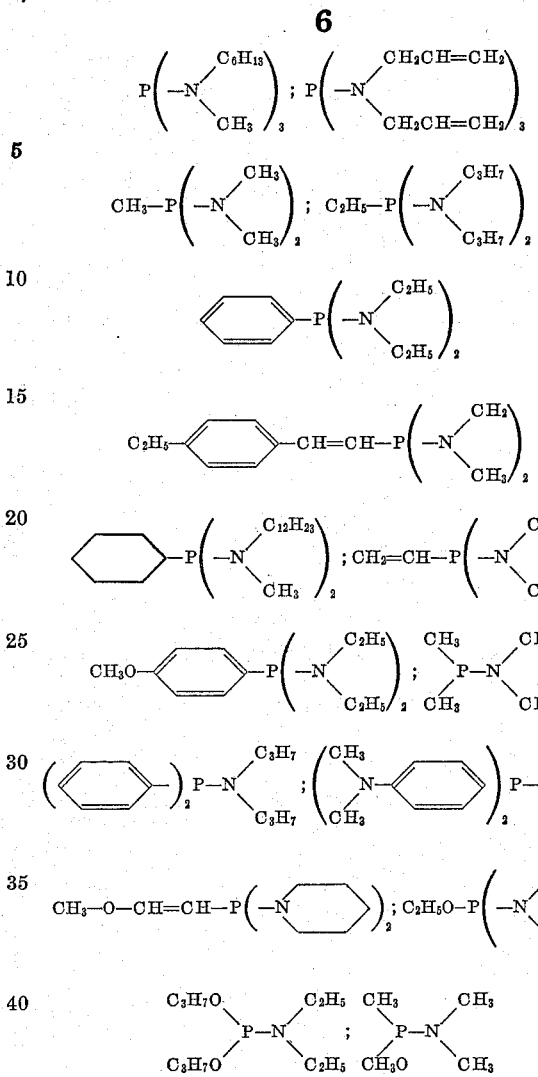

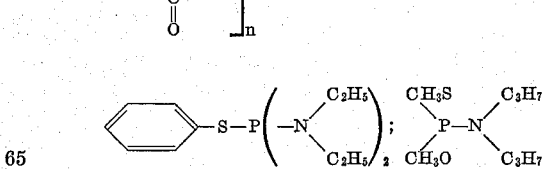

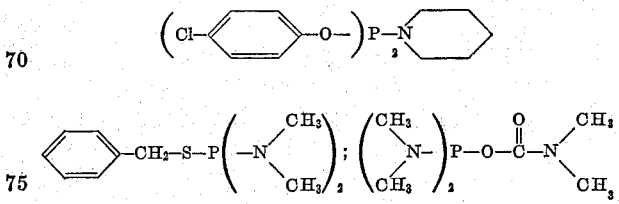

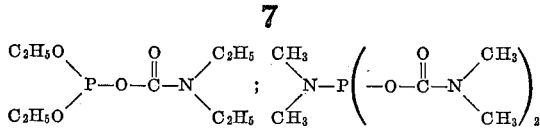

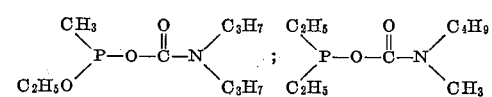

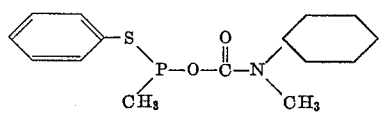

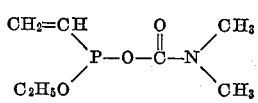

The conditions under which the process according to the invention is carried out can vary. A catalytic amount of the catalyst should be used. The catalyst should preferably be used in an amount of from about 0.01 to about 10.0% by weight, calculated on the isocyanate to be dimerized. The reaction temperature is suitably from —20° to +150° C. Furthermore, the reaction can take place with or without solvents or diluents. Suitable inert diluents are, for example, benzine, benzene, ethyl, acetate, methylene chloride and acetone.

The dimerization of the isocyanates is preferably carried out in the presence of 0.1 to 1.0% by weight of catalyst, based on isocyanate used, and at temperatures from about 10 to about 40° C. in inert diluents. It is best initially to place the isocyanate, dissolved in the inert diluent, in the reaction vessel and to add the catalyst, all at once or in several successive portions, at 10 to 30° C. while cooling slightly and stirring vigorously. Depending upon the solvent used, the dimer precipitates immediately, i.e. a few minutes, in crystalline form from the solution and can then be separated out, for example, by filtration, or it remains in solution and is obtained by evaporating the solvent. However, the solution of the isocyanate and the catalyst may be supplied simultaneously, and perhaps continuously, to a reaction vessel in which the dimerization then takes place.

The dimers prepared in accordance with this invention are useful in any application wherein isocyanates can be used in a reaction. For example, the product can be utilized for reaction with active hydrogen compounds to prepare cellular products useful in the furniture industry and also to prepare non-porous elastomers which find use in the preparation of vehicle tires, shock absorbers, ball and socket joints, shoe soles and heels and the like.

The invention is further illustrated but not limited by the following examples in which parts are by weight unless otherwise specified.

*Example 1*

Production of

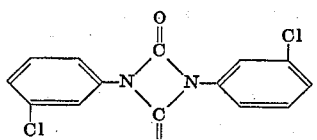

About 10 parts of m-chlorophenyl isocyanate are dissolved in about 30 parts of petroleum ether. About 0.1 part of phosphorous acid tris-(dimethylamide) is added and the mixture is thoroughly stirred. After about 1 to 2 minutes, the solution becomes cloudy and colorless crystals quickly precipitate. The crystal magma which is obtained is left standing overnight, the crystals are suction-filtered and are dried in vacuo.

Yield: 9.9 parts (99% of the theoretical) of colorless crystals; M.P. 165 to 166° C.

In order to test the filtrate for the presence of any phosphorous acid tris-(dimethylamide) fresh m-chlorophenyl isocyanate is added. After standing for about 12 hours, no clouding of the solution is found. On evaporated, unmodified m-chlorophenyl isocyanate is recovered.

In analogous manner, the following results are obtained with other catalysts:

| Catalyst | Yield | M.P. (in ° C.) |
|---|---|---|
| $P(-N(C_2H_5)_2)_3$ | 10.0 parts (100%) | 165 |
| $C_2H_5O-P(-N(C_2H_5)_2)_2$ | 9.9 parts (99%) | 166 |
| $(C_2H_5O)_2P-O-C(=O)-N(CH_3)_2$ | 9.5 parts (95%) | 165–166 |
| $(C_2H_5O)_2P-O-C(=O)-N(C_2H_5)_2$ | 8.7 parts (87%) | 166 |

*Example 2*

Production of

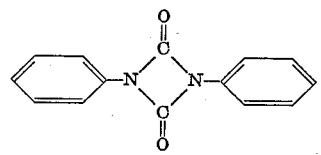

About 10 parts of phenyl isocyanate are reacted in about 30 parts of petroleum ether with about 0.1 part of phosphorous acid tris-(dimethylamide), in a manner similar to Example 1 and about 9.8 parts (98%) of colorless crystals of melting point 175° C. are obtained.

The following results are obtained in similar manner with other catalysts:

| Catalyst | Yield | M.P. (in ° C.) |
|---|---|---|
| $C_2H_5-P(-N(CH_3)_2)_2$ | 9.9 parts (99%) | 174 |
| $(C_2H_5O)_2P-N(C_2H_5)_2$ | 8.8 parts (88%) | 175 |

Example 3

In a manner similar to Example 1, 10 parts of different isocyanates are each treated with 0.08 part of phosphorous acid tris-(dimethylamide). The following results are obtained

| Isocyanate | Reaction Product | Yield | M.P. (in °C.) |
|---|---|---|---|
| Cl—⟨⟩—NCO | Cl—⟨⟩—N(CO)₂N—⟨⟩—Cl | 9.9 pts. (99%) | 174 |
| Cl—⟨⟩(Cl)—NCO | Cl—⟨⟩(Cl)—N(CO)₂N—⟨⟩(Cl)—Cl | 9.5 pts. (95%) | 178–179 |
| CH₃—⟨⟩—NCO | CH₃—⟨⟩—N(CO)₂N—⟨⟩—CH₃ | 9.6 pts. (96%) | 178 |
| C₂H₅—⟨⟩—NCO | C₂H₅O—⟨⟩—N(CO)₂N—⟨⟩—OC₂H₅ | 8.8 pts. (88%) | 175–176 |

Example 4

Production of

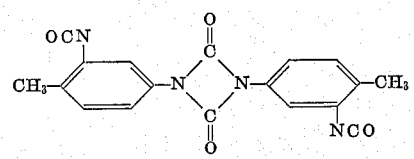

About 500 parts of toluylene-2,4-diisocyanate are dissolved in about 1200 parts of ligroin and about 2.5 parts of phosphorous acid tris-(dimethylamide) are added while stirring vigorously. Colorless crystals precipitate immediately. After about 20 minutes, about another 1.5 parts of the catalyst are added to the crystal magma and yet another 1.0 part of the catalyst after a further 20 minutes. The crystal magma is left to stand overnight. The crystals are suction-filtered and dried in vacuo. About 480 parts (96% of the theoretical) of dimer are obtained as colorless crystals of melting point 154° C.

Example 5

About 1036 parts of diphenylmethane-4,4'-diisocyanate are dissolved in about 2000 parts of benzene. About 5.5 parts of phosphorous acid tris-(dimethylamide) are added at about 25° C. while stirring vigorously. The suspension which forms is stirred for about 30 minutes at about room temperature and then about another 3 parts of the catalyst are added. After 3 to 4 hours, the crystals are suction-filtered and dried in vacuo. The reaction product is a colorless crystalline powder of melting point 250 to 251° C. It is sparingly soluble in most solvents but has good solubility in hot dimethyl formamide.

Yield: 990 parts (95.5% of the theoretical)

It is, of course, to be understood that any of the aromatic isocyanates set forth throughout the specification can be dimerized by procedures set forth in the working examples and therefore can be used in place of those specifically used therein. Further, any of the catalysts in accordance with the formula set forth can be used in place of those specifically used in the examples.

Although the invention has been described in considerable detail for the purpose of illustration, it is to be understood that variations can be made by those skilled in the art without departing from the spirit of the invention and scope of the claims.

What is claimed is:

1. A process for the dimerization of aromatic isocyanate having at least one NCO group bonded to an aromatic ring which has only hydrogen atoms on ortho carbon atoms which comprises contacting said aromatic isocyanate with a catalytic amount of a compound having the formula

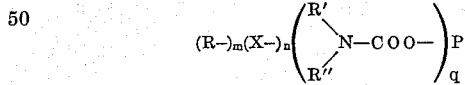

where R is selected from the group consisting of alkyl, alkenyl, cycloalkyl, aralkyl, aryl, O-alkyl, O-alkenyl, O-cycloalkyl, O-aralkyl, O-aryl, S-alkyl, S-alkenyl, S-cycloalkyl, S-aralkyl and S-aryl; X is selected from the group consisting of

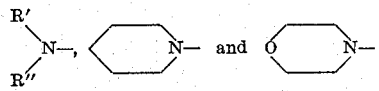

R' and R" are selected from the group consisting of alkyl, alkenyl, and cycloalkyl; m and q are cardinal numbers frmo 0 to 2 and n is a cardinal number from 0 to 3, the sum of m, n and q being 3.

2. The process in accordance with claim 1 wherein from about 0.01 to about 10 percent by weight calculated on the quantity of isocyanate present of the catalyst is used.

3. The process in accordance with claim 1 wherein from about 0.1 to about 1 percent by weight calculated on the quantity of isocyanate present of the catalyst is used.

4. The process in accordance with claim 1 wherein the temperature is maintained at from about −20° C. to about 150° C.

5. The process in accordance with claim 1 wherein the reaction is conducted in an inert diluent.

6. The process in accordance with claim 1 wherein the reaction is conducted in an inert diluent at a temperature of from about 10 to about 40° C.

7. The process in accordance with claim 1 wherein the catalyst is phosphorous acid tris-(dimethylamide).

8. The process for dimerizing 2,4-toluylene diisocyanate which comprises contacting said isocyanate with a catalytic amount of phosphorous acid tris-(dimethylamide).

References Cited by the Examiner
UNITED STATES PATENTS 2,683,144  7/1954  Balon et al. _____ 260—239

ALEX MAZEL, *Primary Examiner.*

HENRY R. JILES, *Examiner.*

ALTON D. ROLLINS, *Assistant Examiner.*